US009797568B2

(12) United States Patent
Akutsu

(10) Patent No.: US 9,797,568 B2
(45) Date of Patent: Oct. 24, 2017

(54) VEHICLE LIGHTING UNIT

(71) Applicant: Stanley Electric Co., Ltd., Tokyo (JP)

(72) Inventor: Tomoya Akutsu, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 119 days.

(21) Appl. No.: 14/822,500

(22) Filed: Aug. 10, 2015

(65) Prior Publication Data

US 2016/0053961 A1 Feb. 25, 2016

(30) Foreign Application Priority Data

Aug. 22, 2014 (JP) ................................ 2014-169827

(51) Int. Cl.
*B60Q 1/00* (2006.01)
*F21S 8/10* (2006.01)

(52) U.S. Cl.
CPC ......... *F21S 48/2206* (2013.01); *F21S 48/215* (2013.01); *F21S 48/2237* (2013.01); *F21S 48/2268* (2013.01); *F21S 48/2287* (2013.01)

(58) Field of Classification Search
CPC .......................... F21S 48/2237; F21S 48/2268
USPC .................................................. 362/511, 555
See application file for complete search history.

(56) References Cited

U.S. PATENT DOCUMENTS

2014/0003075 A1* 1/2014 Yamada ............... B60Q 1/0035 362/511
2014/0078764 A1* 3/2014 Aizawa ............... F21S 48/2268 362/511
2014/0140081 A1* 5/2014 Takahashi ........... F21S 48/2206 362/509
2014/0334172 A1* 11/2014 Kosugi ................ F21S 48/1154 362/511

FOREIGN PATENT DOCUMENTS

JP 2013-161697 A 8/2013

* cited by examiner

*Primary Examiner* — Julie Bannan
(74) *Attorney, Agent, or Firm* — Kenealy Vaidya LLP

(57) ABSTRACT

A vehicle lighting unit, such as a rear combination lamp, can include an LED serving as a light source and a light guiding lens housed within a lighting chamber defined by a housing and an outer lens covering an opening of the housing. The light guiding lens can have a light incident surface configured to receive light from the LED and an attachment portion provided near the light incident surface and extending in a direction perpendicular to a direction in which the light is incident on the light incident surface. The light guiding lens is configured to guide and deflect the light to be illuminated with the light, and such that the thickness of a portion after the attachment portion is greater than that of a portion before the attachment portion.

2 Claims, 4 Drawing Sheets

VEHICLE LIGHTING UNIT

This application claims the priority benefit under 35 U.S.C. §119 of Japanese Patent Application No. 2014-169827 filed on Aug. 22, 2014, which is hereby incorporated in its entirety by reference.

TECHNICAL FIELD

The presently disclosed subject matter relates to a vehicle lighting unit that causes a light guiding lens to be illuminated with light emitted from a light emitting element.

BACKGROUND ART

A rear combination lamp to be disposed in a rear portion of a vehicle body on either side has been known to include a plurality of types of lamps having different functions within a lighting chamber defined by a housing and an outer lens that covers the opening of the housing. Such lamps having different functions may include a tail lamp, a turn indicator lamp, a back-up lamp, and the like.

Such a rear combination lamp is demanded to be reduced in size. In order to do so, some rear combination lamps have been configured to employ a light emitting element such as a light emitting diode (LED) as at least one of the plurality of types of lamps, for example, as a light source for a tail lamp. In these lamps, further employed is a light guiding lens that is configured to guide light emitted from the light emitting element to be illuminated with the light as if the light guiding lens itself can emit light. This type of lighting unit can be found in a publication of Japanese Patent Application Laid-Open No. 2013-161697.

When the light guiding lens is to be illuminated with light emitted from the light emitting element, there is known a conventional light guiding lens 111 as illustrated in FIG. 1. This light guiding lens 111 can have an attachment portion 111C integrally formed near a light incident surface 111*a* thereof. The attachment portion 111C herein is formed to extend in a direction substantially perpendicular to a direction in which the light is incident on and substantially travels through the light guiding lens 111.

In this lamp in which the attachment portion 111C is integrally formed in part of the light guiding lens 111, as illustrated in FIG. 1, the light emitted from a light emitting element 109 can enter the light guiding lens 111 through the light incident surface 111*a* and can be repeatedly totally reflected to travel within the light guiding lens 111. In this case, part of the light travelling within the light guiding lens 111 may be spread into and pass and exit through the attachment portion 111C to the outside without total reflection, as illustrated in FIG. 1. Therefore, there arises a problem in which the base end portion or the like of the attachment portion 111C emit light to be locally illuminated (so-called point light emission), whereby it is not desirable in terms of aesthetic point of view.

SUMMARY

The presently disclosed subject matter was devised in view of these and other problems and features in association with the conventional art. According to an aspect of the presently disclosed subject matter, a vehicle lighting unit can prevent a light guiding lens from locally emitting light (point light emission).

According to another aspect of the presently disclosed subject matter, a vehicle lighting unit can include a housing having an opening; an outer lens that can cover the opening of the housing to define a lighting chamber together with the housing; a light emitting element serving as a light source; and a light guiding lens having a light incident surface configured to receive light from the light emitting element and an attachment portion provided near the light incident surface and extending in a direction substantially perpendicular to a direction in which the light is incident on the light incident surface. In the vehicle lighting unit, the lighting chamber contains the light emitting element and the light guiding lens, and the light guiding lens is configured to guide and deflect the light emitted from the light emitting element and entering the light guiding lens to be illuminated with the light. Furthermore, the light guiding lens is configured to be changed in any one of thickness and diameter thereof before and after a portion where the attachment portion is located so that any one of the thickness and the diameter of a portion after the portion where the attachment portion is located is greater than that of a portion before the portion where the attachment portion is located.

According to a second aspect of the presently disclosed subject matter, the vehicle lighting unit can be configured such that the attachment portion can have a base end portion having a thickness smaller than that of the other portion of the attachment portion.

The light guiding lens is configured such that the thickness or diameter of the portion of the light guiding lens before and after the portion where the attachment portion is provided is changed to be greater in the portion after the attachment portion than in the portion before the attachment portion. This configuration can control the light, which has been spread at the base end portion of the attachment portion and entered the attachment portion to exit through the base end portion of the attachment portion in the conventional case as illustrated in FIG. 1, not to exit at that portion to the outside, but to impinge on the portion after the attachment portion and then be totally reflected repeatedly after that. In this manner, the point light emission at the base end portion of the attachment portion can be effectively prevented.

Furthermore, since the base end portion of the attachment portion is made thinner than the other portions of the attachment portion, the length of the attachment portion along the light traveling direction at the base end portion can be shortened and the entering of light spread at the base end portion of the attachment portion can be prevented more reliably (namely, the light conventionally spread toward the attachment portion can be reliably directed to the portion after the attachment portion).

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting unit of the presently disclosed subject matter with reference to the accompanying drawings in accordance with exemplary embodiments.

Figure 2:
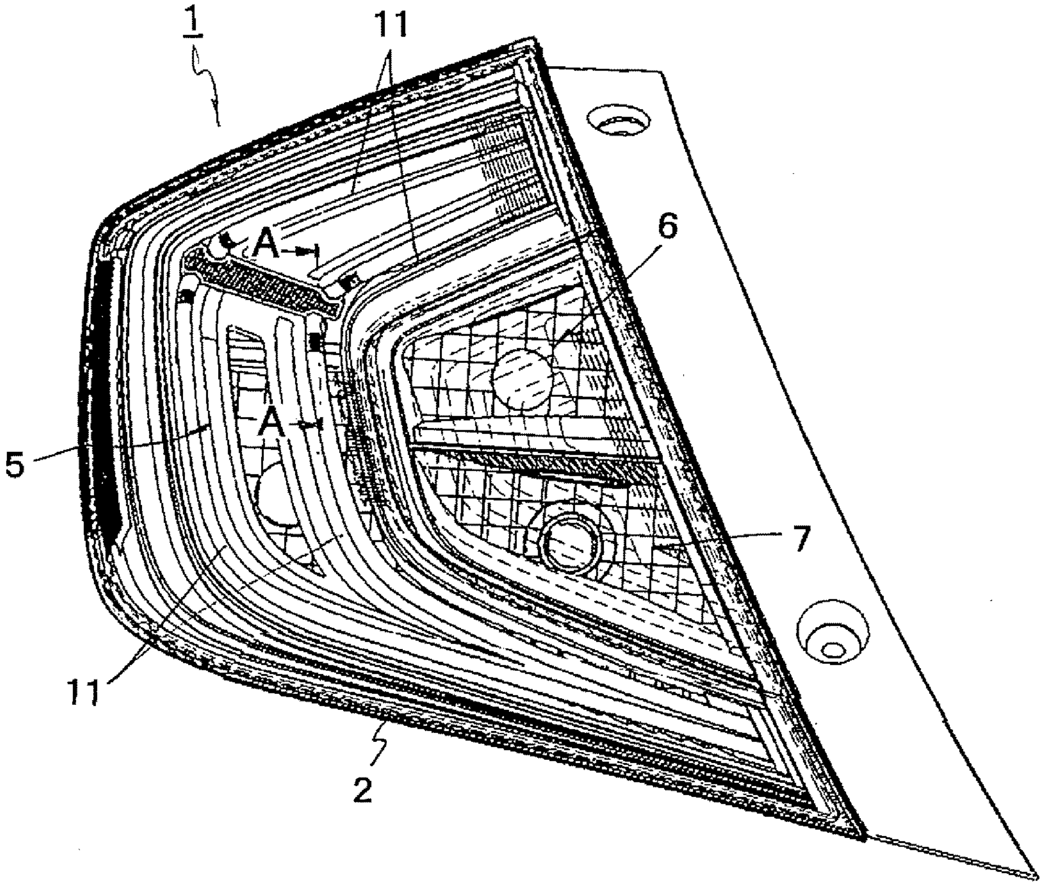
FIG. 2 is a front view of a rear combination lamp as a vehicle lighting unit made in accordance with principles of the presently disclosed subject matter.
Figure 3:
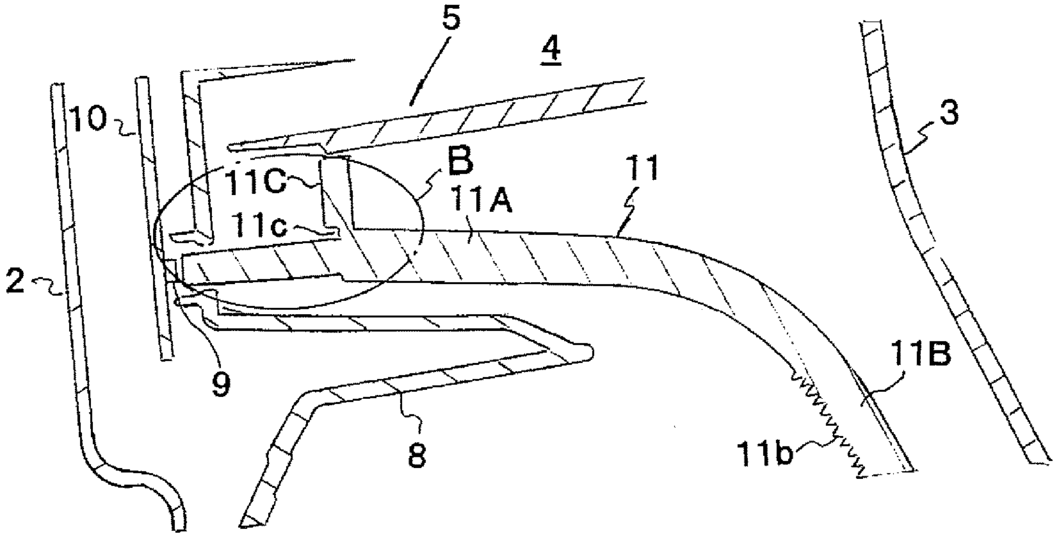
FIG. 3 is a cross-sectional view of the rear combination lamp taken along line A-A in FIG. 2.
Figure 4:
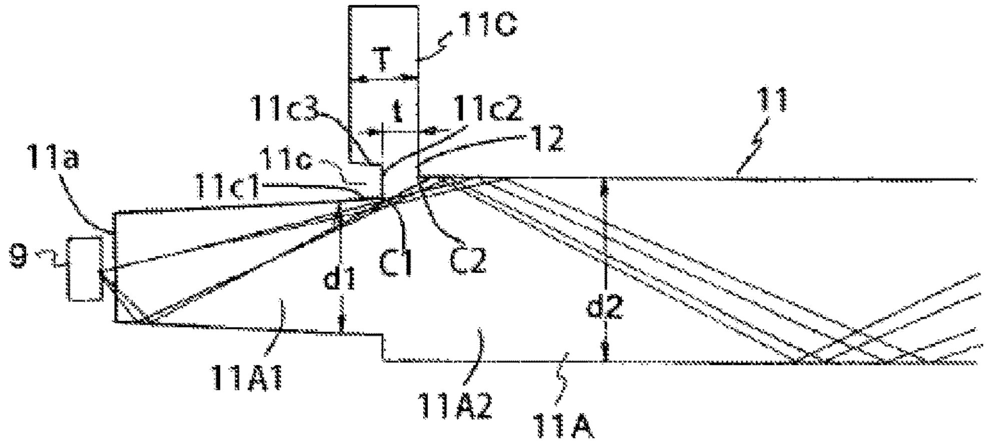
FIG. 4 is an enlarged view of the portion B in FIG. 3 in detail.

FIG. 2 is a front view of a rear combination lamp as one embodiment of the vehicle lighting unit made in accordance with principles of the presently disclosed subject matter, FIG. 3 is a cross-sectional view of the rear combination lamp taken along line A-A in FIG. 2, and FIG. 4 is an enlarged view of the portion B in FIG. 3 in detail. In general, an automobile can include rear combination lamps on respective right and left sides of the rear portion of a vehicle body and thus the rear combination lamps on the respective right and left sides have the same symmetric structure. Thus, in the following description, only a rear combination lamp on the left side will be illustrated and discussed.

The rear combination lamp 1 made in accordance with the principles of the presently disclosed subject matter can be disposed on the left side of the rear part of a vehicle body as illustrated in FIG. 2, and can include a housing 2 having an opening; and an outer lens 3 that can cover the opening of the housing 2 to define a lighting chamber 4 (as illustrated in FIG. 3) together with the housing 2. The lighting chamber 4 can contain a plurality of lamps with different functions, such as a tail and stop lamp 5, a turn indicator lamp 6, and a back-up lamp 7, and an extension 8 covering the peripheries of these tail and stop lamp 5, turn indicator lamp 6, and back-up lamp 7. These parts can be integrally configured with each other.

In this rear combination lamp 1 with the above-configuration, the turn indicator lamp 6 and the back-up lamp 7 can each employ a not-illustrated bulb as a light source, and can be disposed on upper and lower sides, respectively, and on an inner side (side closer to the center) of the vehicle body (on the right side of FIG. 2). The tail and stop lamp 5 can employ an LED 9 as a light source as illustrated in FIG. 3, and can be disposed on an outer side (side farther from the center) of the vehicle body to surround the turn indicator lamp 6 and the back-up lamp 7 from their outer sides.

As illustrated in FIG. 3, the LED 9 as the light source for the tail and stop lamp 5 can be mounted on a planar substrate 10 substantially vertically erected. The tail and stop lamp 5 can further include a light guiding lens 11 that is illuminated with the light emitted from the LED 9 as if the light guiding lens 11 itself can emit light.

The light guiding lens 11 can be formed from a transparent resin such as an acrylic resin, a polycarbonate resin, and the like, and molded in a round bar shape. As illustrated in FIG. 3, the light guiding lens 11 can include a horizontal portion 11A extending substantially in a horizontal direction along the optical axis of the LED 9 and in a rearward direction of the vehicle body (rightward in FIG. 3), and an aesthetic portion 11B extending from the end of the horizontal portion 11A (right end in FIG. 3) obliquely downward while curved in an arc shape. The horizontal portion 11A of the light guiding lens 11 can have an end face that faces to the LED 9 and serves as a light incident surface 11*a* on which the light emitted from the LED 9 can be incident to enter the light guiding lens 11 and, as shown in detail in FIG. 4, can also have (i) a first intersection (C1) defined by a portion where a first side surface (11*c*1) and a bottom surface (11*c*2) of rectangular recess 11*c* cross each other, (ii) a first portion (11A1) located closer to the light incident surface (11*a*) than the first intersection (C1) and a second portion (11A2) located farther from the light incident surface (11*a*) than the first portion (11A1), and (iii) a second intersection (C2) defined by a portion where a side surface (12) of the attachment portion (11C) opposite to the bottom surface (11*c*2) and the second portion (11A2) cross each other. Furthermore, an attachment portion 11C can be integrally formed at a portion near the light incident surface 11*a* of the horizontal portion 11A so that the attachment portion 11C can be disposed in a direction substantially perpendicular to the incident direction of light from the LED 9, or its optical axis. Further, a plurality of prism-shaped cuts 11*b* can be formed on a rear surface of the aesthetic portion 11B.

Then, in the present exemplary embodiment as illustrated in FIG. 4, a rectangular recess 11*c* (opened toward the light incident surface 11*a* and including the first side surface 11*c*1 on a side of the horizontal portion 11A of the light guiding lens, the bottom surface 11*c*2 at the bottom of the recess 11*c* and a second side surface 11*c*3 on a side of the attachment portion 11C and) can be formed at the base end portion of the attachment portion 11C. Due the provision of the recess 11*c*, the thickness t of the base end portion of the attachment portion 11C can be set to be smaller than the thickness T of the other portion of the attachment portion 11C. (Namely, t<T.) Furthermore, the diameter of the light guide lens 11 can be changed before and after a portion where the attachment portion is located, and specifically, the diameter d2 of the light guiding lens 11 after that portion can be set to be larger than the diameter d1 of the light guiding lens 11 before that portion. (Namely, d2>d1.) Although the present exemplary embodiment employs the light guiding lens 11 in a round bar shape, but the light guiding lens 11 can take a plate shape. In this case, the thickness of the light guiding lens 11 after that portion can be set to be larger than the thickness of the light guiding lens 11 before that portion.

When the LED 9 as the light source of the tail and stop lamp 5 in the rear combination lamp 1 with the above configuration is supplied with a current to emit light, the light emitted from the LED 9 in the optical axis direction (or a rear direction of the vehicle body) can be incident on the light incident surface 11*a* of the horizontal portion 11A of the light guiding lens 11, to thereby enter the light guiding lens 11. Then, the entering light can travel within the light guiding lens 11 rearward (rightward in FIG. 4) while being repeatedly totally reflected by the inner surface of the light guiding lens 11, and refracted by the cuts 11*b* (see FIG. 3) formed in the rear surface of the aesthetic portion 11B of the light guiding lens 11, to thereby exit through the surface of the aesthetic portion 11B in a rearward direction of the vehicle body. Therefore, the aesthetic portion 11B of the light guiding lens 11 can be illuminated with light, so that the fundamental function of the tail and stop lamp can be achieved.

In the present exemplary embodiment, the rectangular recess 11*c* can be formed at the base end portion of the attachment portion 11C, so that the thickness t at the base end portion can be made smaller than the thickness T of the other portion of the attachment portion 11C (t<T). since the base end portion of the attachment portion 11C is made thinner than the other portions of the attachment portion 11C, the length (t) of the attachment portion 11C along the light traveling direction at the base end portion can be shortened and the entering of light spread at the base end portion of the attachment portion 11C can be prevented more reliably.

Figure 1:
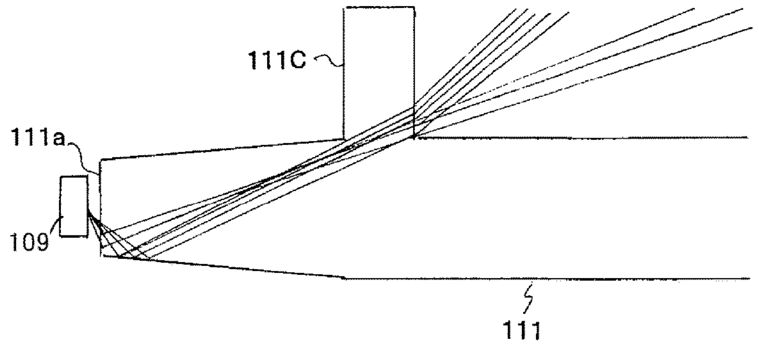
Fig. 1 Conventional Art
FIG. 1 is a cross-sectional view of a part of a conventional light guiding lens.

The light guiding lens 11 is configured such that the diameter (or thickness) of the portion of the light guiding lens 11 before and after the portion where the attachment portion 11C is provided is changed to be greater in the portion after the attachment portion 11C than in the portion before the attachment portion 11C. This configuration can control the light, which has been spread at the base end portion of the attachment portion 111C and entered the attachment portion 111C to exit through the base end portion of the attachment portion 111C in the conventional case as illustrated in FIG. 1, not to exit at that portion to the outside, but to impinge on the portion after the attachment portion 11C and then be totally reflected repeated after that. In this manner, the point light emission at the base end portion of the attachment portion 11C can be effectively prevented.

Although the above exemplary embodiment has dealt with the case where the presently disclosed subject matter is applied to the tail and stop lamp of a rear combination lamp, the presently disclosed subject matter can be applied to any vehicle lighting units including a light guiding lens illuminated with light from a light emitting element such as an LED.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising: a housing having an opening;

an outer lens that covers the opening of the housing to define a lighting chamber together with the housing;

a light emitting element serving as a light source; and a light guiding lens having a light incident surface configured to receive light from the light emitting element and an attachment portion provided near the light incident surface and extending in a direction substantially perpendicular to a direction in which the light is incident on the light incident surface, the lighting chamber containing the light emitting element and the light guiding lens, the light guiding lens being configured to guide and deflect the light emitted from the light emitting element and entering the light guiding lens to be illuminated with the light, wherein the attachment portion has a base end portion which connects to a horizontal portion of the light guiding lens and at which a recess is formed to be recessed in a direction opposite to the light incident surface, the recess includes a first side surface on a side of the horizontal portion of the light guiding lens, a bottom surface at the bottom of the recess, and a second side surface on a side of the attachment portion, a first intersection is defined by a portion where the first side surface of the recess and the bottom surface meet each other, the horizontal portion includes a first portion located closer to the light incident surface than the first intersection and a second portion located farther from the light incident surface than the first portion, and a second intersection is defined by a portion where a side surface of the attachment portion opposite to the bottom surface and the second portion meet each other, the light guiding lens has any of thickness and diameter near the base end portion that is larger in the second portion on a farther side from the light incident surface than the second intersection than in the first portion.

2. The vehicle lighting unit according to claim 1, wherein a distance between a center axis of the light guiding lens and the second intersection is larger than a distance between the center axis and the first intersection.

* * * * *